United States Patent [19]

Piet et al.

[11] 4,137,057

[45] Jan. 30, 1979

[54] REFRIGERATING SYSTEMS WITH MULTIPLE EVAPORATOR FAN AND STEP CONTROL THEREFOR

[75] Inventors: Zenon Piet, Princeton, N.J.; Daniel Kramer, Yardley, Pa.

[73] Assignee: Kramer Trenton Co., Trenton, N.J.; by said Zenon Piet

[21] Appl. No.: 765,805

[22] Filed: Feb. 4, 1977

[51] Int. Cl.² .................................................. F25D 17/06
[52] U.S. Cl. ............................................ 62/89; 62/179; 62/186
[58] Field of Search ............... 62/179, 180, 186, 89, 62/426; 236/DIG. 9, 1 E

[56] References Cited

U.S. PATENT DOCUMENTS

| | | | |
|---|---|---|---|
| 3,390,539 | 7/1968 | Miner | 62/184 |
| 3,877,293 | 4/1975 | Kramer | 62/180 |
| 3,959,979 | 6/1976 | Kramer | 62/180 X |

Primary Examiner—William E. Wayner
Attorney, Agent, or Firm—Daniel E. Kramer

[57] ABSTRACT

A refrigeration system for cooling air having an evaporator; a compressor; a control for establishing ON periods and OFF periods of the compressor; at least two motor-driven fans positioned to force air over the evaporator; and a control system for the evaporator fans to cause fewer of the fans to run during compressor OFF periods and more of the fans to run during compressor ON periods.

2 Claims, 3 Drawing Figures

FIGURE 1

REFRIGERATING SYSTEMS WITH MULTIPLE EVAPORATOR FAN AND STEP CONTROL THEREFOR

BACKGROUND OF THE INVENTION

1. Field of the Invention

This invention generally relates to power-saving measures for refrigeration systems having forced air evaporators which are used to cool enclosures under a variety of load conditions. In particular, the invention relates to reduction of heat input from the evaporator fans and motors to the enclosure during light load conditions.

2. Description of the Prior Art

Refrigeration systems for cooling refrigerators and freezers, employing evaporators having motor-driven fans, are well known. It is currently normal practice to leave the fan motors on the evaporator running at full speed whether the compressor is in operation or not. A recent innovation disclosed by U.S. Pat. Nos. 3,877,243 and 3,959,979 discloses means for operating the fan at full speed only when the compressor is operating and provides means for operating the evaporator fan at reduced speed when the compressor is off.

2. Brief Summary of the Invention

Refrigeration evaporators, which are used to cool enclosed spaces such as coolers or freezers, do not operate at full capacity all the time. They operate at full capacity only at those times that the compressors to which they are connected operate at full capacity. This occurs generally when the need for cooling is high or when the cooling thermostat directly or indirectly initiates compressor operation. At other times the compressor either operates at reduced capacity or is turned completely off.

Those skilled in the art of refrigeration know that high air velocity is necessary during periods when maximum cooling is required in order to provide adequate operation of the refrigerating evaporator. However, during off cycle, or non-refrigerating periods, only enough air need be circulated through the box in order to maintain a small temperature gradient throughout the interior of the box.

In fact, the inventors have determined that allowing high evaporator air flow to continue during periods of reduced cooling requirement, such as compressor off cycles, is unnecessary and wasteful of energy and harmful to the stored product in at least the following ways:

(a) The high air velocity increases the film coefficient between the air within the enclosure and the enclosure wall and thereby tends to increase heat flow from outside the enclosure through the wall and into the enclosure.

(b) When the compressor is not operating, or operating at reduced load, full power operation of all the evaporator fans requires the expenditure of substantial amounts of electrical energy, which is transmitted into the box as heat. In order to remove this heat from the enclosure, the compressor must operate for a sufficient period of time to do so, thereby consuming substantial additional power. Therefore, unnecessary operation of evaporator fans causes extra power consumption in two ways: (1) the power consumption required to run the evaporator fan, and (2) the power consumption required by the compressor to pump out the heat deposited in the box by the unnecessary running of the evaporator fans.

(c) High air velocity over the product tends to dehydrate the surface of the product, reducing the marketable product weight and causing a reduction in product quality.

The fraction of the fans which turn off when the capacity of the compressor is reduced or during compressor OFF conditions need not be pre-set. Where there are only two evaporator fans, then usually one will be turned off. If there are three evaporator fans, usually one or two will be turned off. In some cases, it may even be possible to turn off all the evaporator fans without any harmful effect when the compressor has been stopped by the operating control.

An advantage of shutting off some of the evaporator fans during compressor OFF cycle, leaving the remainder operating at full speed, is that full air throw is maintained. Air throw depends on air discharge velocity. When those fans remaining in operation continue to operature at their normal speed thus retain their rated discharge air velocity and their air throw remains unchanged.

The mechanism for turning off the evaporator fans may be directly related to the energization of the compressor motor or may be directly related to the condition of satisfaction or dissatisfaction of a cooling thermostat, or may be related to the unloaded condition of the compressor, or may be related to the condition of the device governing the degree of unloading of the compressor.

In an alternative construction, the fans are the directly controlled element and the compressor capacity control mechanism responds to the ON-OFF condition of the fans.

DETAILED DESCRIPTION OF THE DRAWINGS

Figure 1:
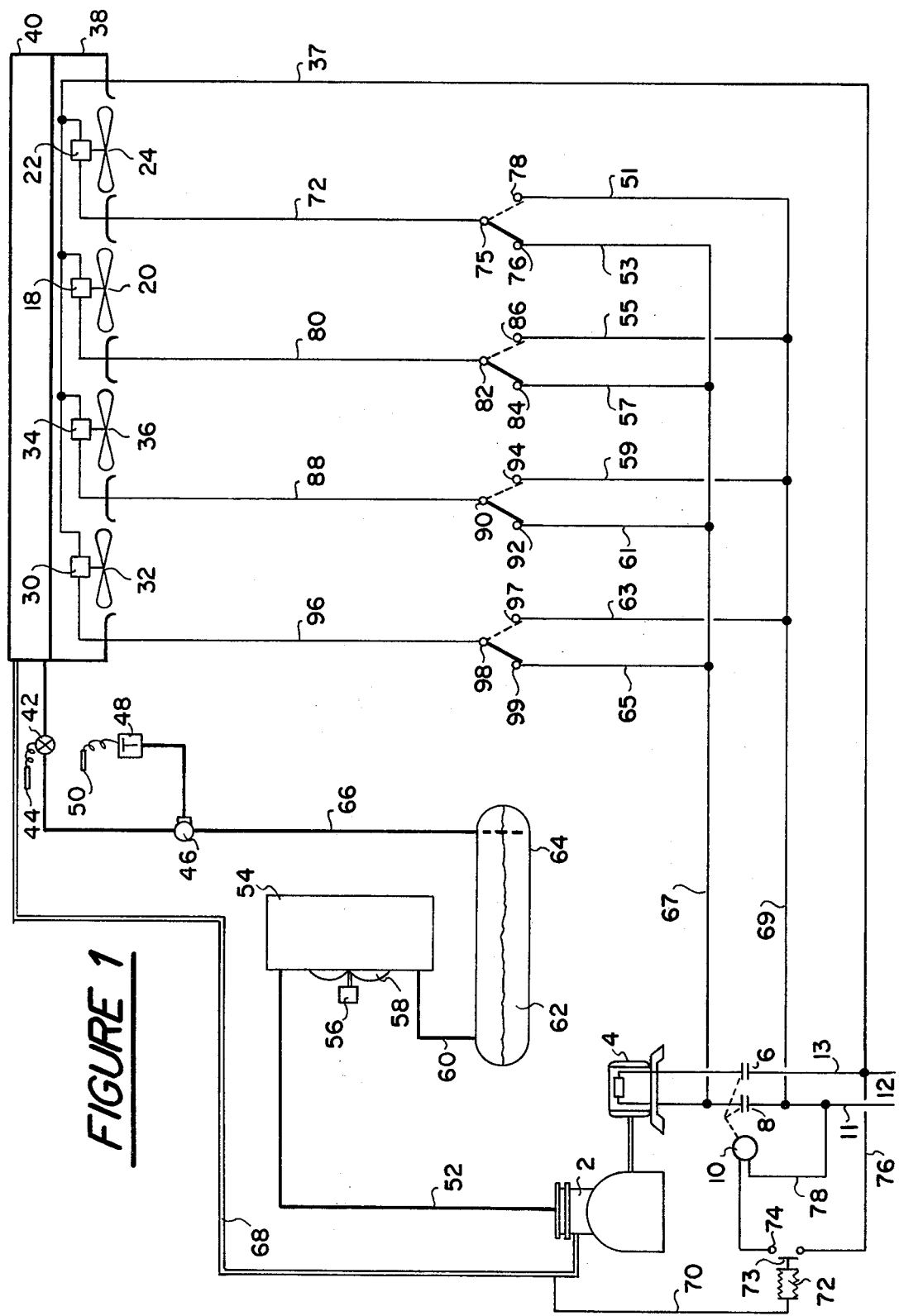
FIG. 1 shows a refrigeration system embodying a feature of the invention and displays an evaporator having multiple fans; some of these fans are connected to operate continuously; the remainder are connected to operate when the compressor is running and to be off when the compressor is stopped and includes manual switches by which the connection can be manually changed from one to the other.

In FIG. 1 there is a mechanical compression type refrigeration system including compressor 2 which is driven by motor 4. Motor 4 is supplied from power supply 12 by way of wires 11 and 13. The power to the motor 4 is controlled by a magnetic switch or contactor, having contacts 8 and 6. These magnetic contacts are actuated by coil 10. The power for coil 10 comes from wires 76 and 78 which are connected respectively to wires 13 and 11 on the power supply side of the contactor. The flow of current to contactor coil 10 is governed by pressure switch 74 actuated by pressure switch bellows 72. When switch 74 is closed, contactor coil 10 is energized and power contacts 6 and 8 are closed, allowing current to flow to compressor motor 4 and causing compressor 2 to operate. When bellows 72 opens switch 74, causing the circuit to contactor coil 10 to open, the contactor coil is deenergized, causing contacts 6 and 8 to open, stopping the flow of power to compressor motor 4 and thereby stopping the operation of compressor 2.

Switch 74 is caused to open and close by thermostat 48 which supplies power to and removes power from the coil of liquid solenoid 46. When thermostat 48 calls for cooling, it energizes the coil of solenoid 46, allowing refrigerant liquid 62 to flow from receiver 64 through the liquid line 66 and the open liquid solenoid 46 to thermostatic expansion valve 42. When the liquid enters the evaporator 40, it evaporates, raising the pressure in the low side and suction line 68, causing the pressure in pressure switch line 70 to enter bellows 52 in turn expanding it to close switch 74, causing compressor motor 4 to run as described above.

When the compressor operates, it withdraws vapor from suction line 68 and discharges it to discharge line 62, which conveys the vapor to condenser 54, wherein it condenses having been exposed to the cooling effect of air moved by fan 58, driven in turn by fan motor 56. The condensed refrigerant flows through conduit 60 to receiver 64, and deposits a pool 62 therein.

When the thermostat 48 is satisfied, it removes power from the coil of solenoid valve 46, causing that valve to close. The compressor continues operation, removing vapor from suction line 68 and lowering the pressure therein until the pressure in bellows 72 has been reduced to the point where it opens switch 74, thereby opening the control circuit to magnetic coil 10, causing that magnetic coil to become deenergized and allowing magnetically controlled contacts 6 and 8 to open, stopping the flow of power to compressor motor 4, which in turn stops, causing the compressor to stop.

The evaporator 38 has four fan motors 22, 18, 34 and 30. These have one connection which is made common through line 57, which is connected to the line side of conductor 13 and is therefore continuously energized. Lead 72 of motor 22 is connected into a double throw switch 75 which in position 76 connects to the low side of contact 8 and in position 78 connects to the line side of contact 8. In position 78 evaporator fan motor 22 is energized continuously regardless of the condition of contacts 6 and 8, or of the magnetic contactor coil 10, or of the pressure switch 74.

If switch 75, however, is moved to position 76, then power is supplied to contact 76 only when connecting line 67 is energized. This occurs only when contacts 6 and 8 are closed. When contacts 6 and 8 are closed, however, the compressor motor 4 and the compressor 2 operate; therefore, when switch 75 is in position 76, the evaporator fan motor 22 operates only when the compressor operates and stops when the compressor stops. When switch 75 is connected in position 78, evaporator fan motor 22 runs all the time, regardless of whether the compressor is operating or is stopped. Exactly analogous explanations apply to the operation of switch 82, with respect to motor 18; switch 90, with respect to motor 34; and switch 98, with respect to motor 30. Therefore, it can be seen that with this control arrangement, all of the fans will operate when the compressor is on, but the operator can decide how many fans will operate when the compressor turns off. At his option he can have no fans operating when the compressor is off, or any one of the fans operating, when the compressor is off, or two, three or four fans operating when the compressor is off. Therefore the operator can determine through his own experience, and so to speak, fine tune the system to make the best compromise between the air motion during the compressor OFF cycle and substantial power saving that can be achieved by having the maximum number of fans turned off during this period.

Figure 2:
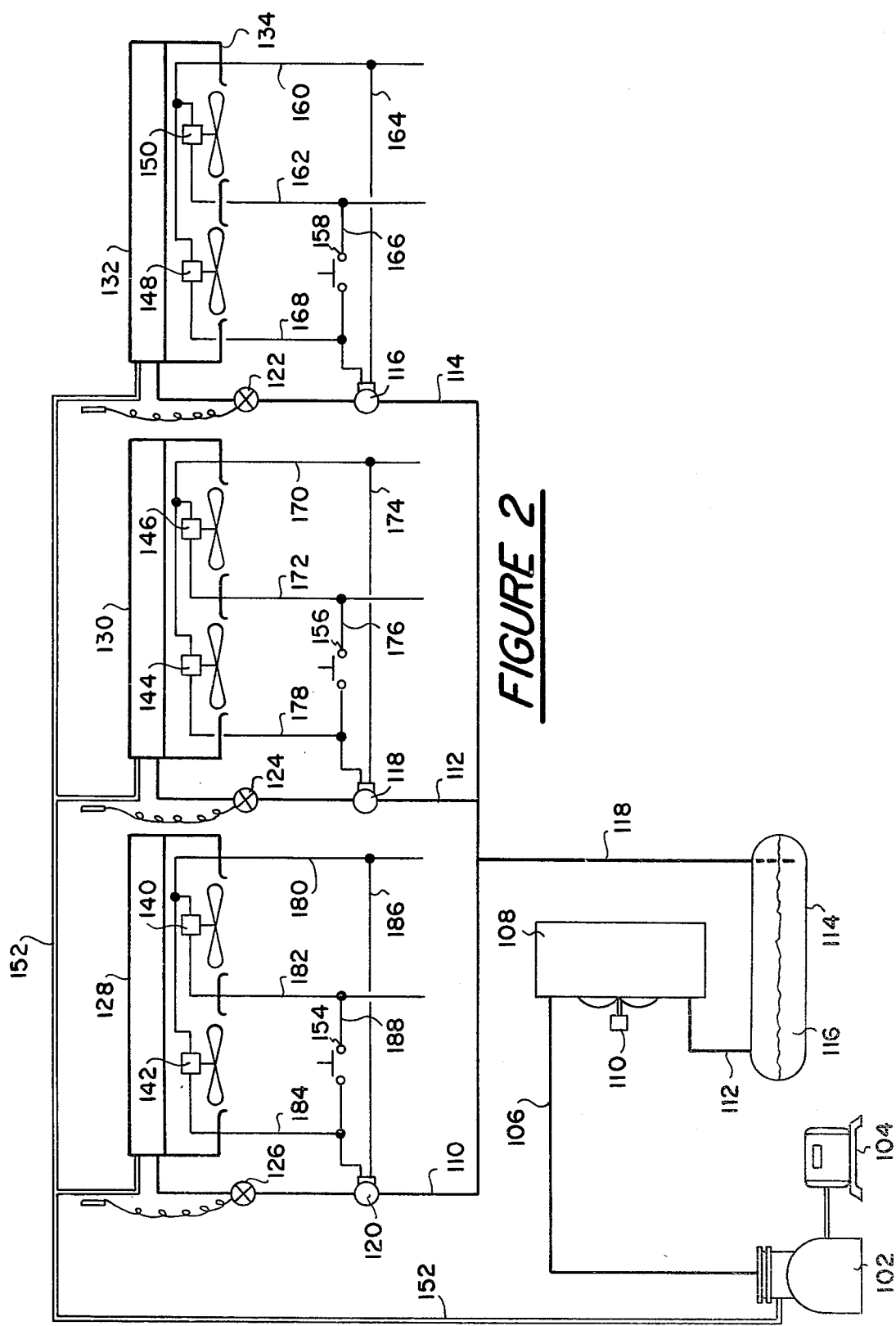
FIG. 2 shows a refrigeration system including multiple evaporators, each with its own temperature control and liquid solenoid valve. Some of the fans on each evaporator are connected to operate continuously. The remainder of the fans on each evaporator are connected to run when the thermostat calls for cooling and to stop when the individual thermostat is satisfied.

FIG. 2 has unloading compressor 102 driven by continuously running motor 104. The compressor discharges refrigerant vapor into discharge line 106, which conveys the vapor to condenser 108, where it is condensed to a liquid and flows through conduit 112 to receiver 114 in which it is stored as pool 116 of liquid refrigerant. From the receiver 114 the liquid 116 is withdrawn as required through liquid line 118 and distributed to the three evaporators through liquid line branches 110, 112 and 114. Liquid branch 110 is controlled by a liquid solenoid 120 and expansion valve 126, which in turn feeds evaporator coil 128. Liquid branch 112 is controlled by liquid solenoid 118 and expansion valve 124, which feeds liquid into evaporator coil 130. Liquid branch 114 is controlled by liquid solenoid 116 and expansion valve 122, which delivers liquid refrigerant into evaporator coil 132. The liquid refrigerant evaporated to a vapor in each of the evaporator coils is delivered to the main suction line 152, by which it is returned to the compressor 102 for recompression and recycling.

Each evaporator has its own thermostat. Evaporator 132 has thermostat 158 controlling its liquid solenoid 116. Evaporator 130 has thermostat 156 controlling its liquid solenoid 118. Evaporator 128 has thermostat 154 controlling its liquid solenoid 120. As each thermostat closes its liquid solenoid, the suction pressure drops, and the internal pressure activated unloading mechanism of compressor 102 causes it to unload in response.

Each evaporator has two motors. On each evaporator, one of the motors is connected to run continuously. On each evaporator, the other motor is connected to run when its liquid solenoid is energized and the solenoid valve is open and is connected to stop when its liquid solenoid is deenergized and closed. In this way the object of the inventors is achieved, even though the compressor motor 104 runs continuously, because the thermostat which controls the operation of a unit of cooling also controls at least a portion of the fans, forcing air over the heat transfer portion of that unit of cooling. Referring, in particular, to evaporator 128; under conditions where the temperature at thermostat 154 is higher than its setting, contacts 154 will be closed. Power will be supplied through power mains 180 and 182 to the coil of liquid solenoid 120 via wires 186 and 188 and therefore the liquid solenoid valve will be open. Both evaporators on motors 140 and 142 will operate. Motor 140 will operate because it is connected directly to power supply line 180 and 182. Motor 142 will operate because its lead 184 is supplied power through closed thermostat 154 and its other lead 185 is continuously supplied power by its connection to power line 180. When the temperature at thermostat 154 is satisfied, contact 154 opens, removing power from the coil of solenoid 120, causing it to close. At the same time, the circuit to wire 184 is broken, and the power is no longer supplied to motor 142. It therefore stops. Motor 140, however, continues to operate since it is unaffected by the action of thermostat switch 154. It should be apparent, however, from the discussion of FIG. 1, and in particular of the switches 74, 82, 90 and 98, shown and described therein, that motor 140 could be connected by way of a manual single pole, double throw switch, to operate in tandem with motor 142 so that both motors run so long as liquid solenoid 120 is energized and open, and stop when the thermostat breaks its contacts 154, causing liquid solenoid 120 to deenergize and close.

Figure 3:
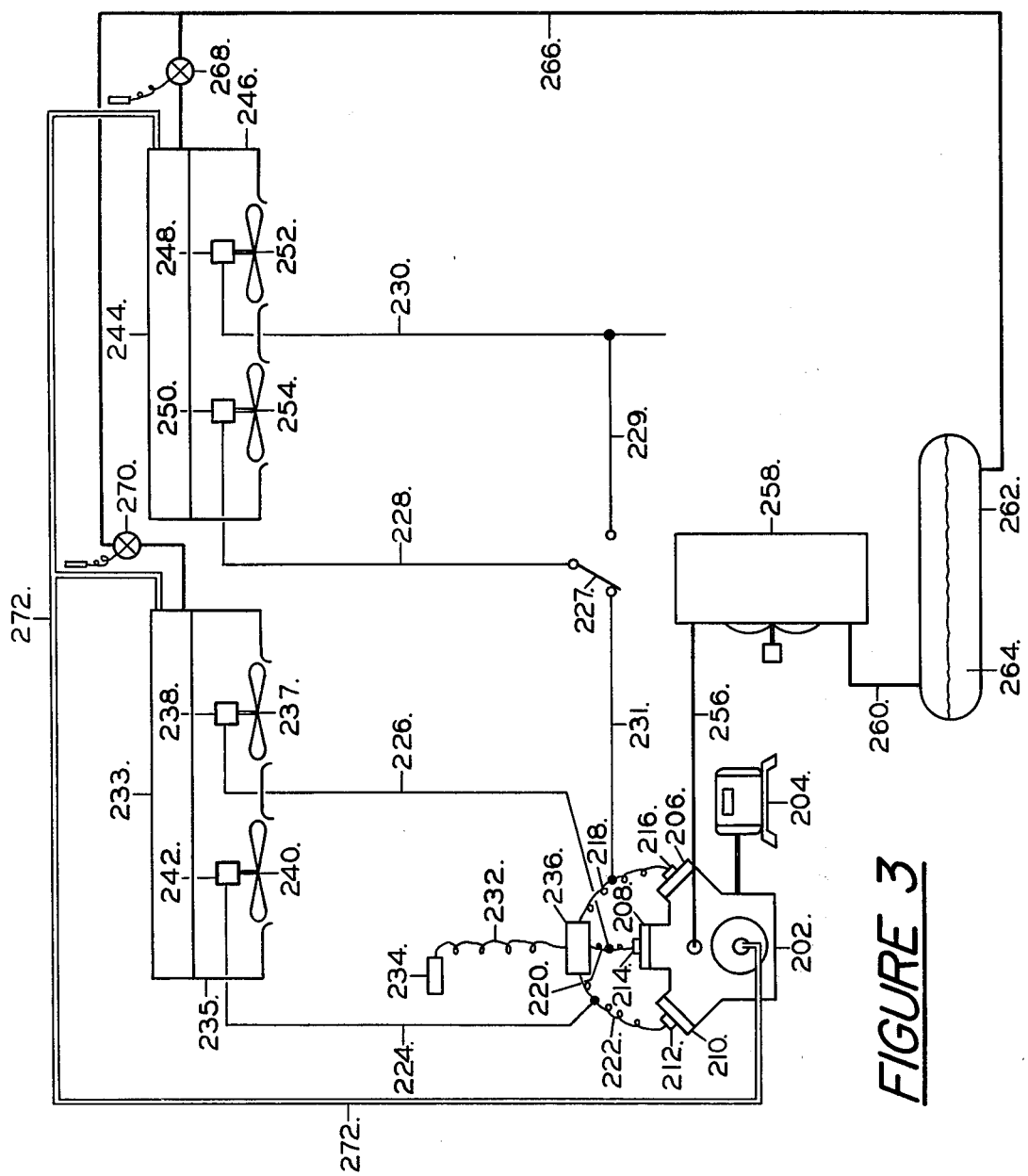
FIG. 3 shows a refrigeration system having evaporators with a multiplicity of fans, an unloading compressor, and a control subject to the temperature in the cooled space governing the degree of unloading. The controlled fans are connected to run when the control loads the compressor, and to turn off when the control unloads the compressor.

In FIG. 3 the refrigeration system has a compressor 202 driven continuously by motor 204. Compressor 202 is of the unloading type and has three cylinder banks, 210, 208 and 206, actuated respectively by unloading mechanisms 212, 214 and 216. The unloading mechanisms are governed by an unloading controller 236, which is connected by wire 222, to unloading mechanism 212; by wire 220 to unloading mechanism 214; and by wire 218 to unloading mechanism 216. The degree of cylinder unloading or, in the case of a screw compressor, the degree of slide valve unloading, is determined by controller 236 which responds to the room temperature, sensed by its governing bulb 234. As the room temperature rises or falls because of increased or decreased load, bulb 234 senses the temperature rise or fall and tells controller 236 to load or unload in turn each of the cylinder banks.

The compressor discharges its compressed hot refrigerant vapor into discharge line 56, by which it is conveyed to condenser 258. In the condenser the hot refrigerant vapor is cooled and condensed to a liquid, which flows through pipe 260 into receiver 262. Here it is collected in refrigerant pool 264. The refrigerant flows, as required, through liquid line 266 to the expansion valve 268, which feeds evaporator 244, and to expansion valve 270, which feeds evaporator 233. The refrigerant which is evaporated to dryness in each of these evaporators flows as vapor into the suction line 272 by which it is returned to the suction inlet of compressor 202.

Evaporator 244 has two fan motors 250 and 248. Evaporator 232 has two fan motors 238 and 242. Fan motor 242 is connected to the unloader mechanism 236 by way of unloader line 222 and fan motor line 224. Fan motor 238 is connected to the unloading mechanism 236 by unloader line 220 and fan motor line 226. Fan motor 250 is connected to the unloading controller 236 by unloading line 218 and fan motor line 231, 228. Notice that in fan motor line 231, 228 there is a manual single pole double throw switch 227 which can make connection either to line 231 or 229. When the switch 227 makes connection to line 231, fan motor 250 operates when cylinder bank 206 is loaded, and stops operation when cylinder bank 206 is unloaded; when switch 227 is connected to line 229, fan motor 250 operates continuously, regardless of the condition of actuation or deactuation of cylinder bank 206. Though not shown, each of the other motors in this system can be connected to the unloading mechanism through a double throw switch in exactly the same way.

On increasing room temperature, as each cylinder bank loads, its associated fans turn on. Fan motor 242 turns on when cylinder Bank 210 is loaded; fan motor 238 turns on with the loading of cylinder Bank 208; and fan motor 250 turns on with the loading of cylinder Bank 206.

As the temperature in the cooled space decreases because of the increased system capacity and increased air motion created by the operation of all the fans, or because of decreasing load, the temperature of bulb 234 decreases, causing the unloading controller 236 to gradually and sequentially unload cylinder banks 206, 208 and 210 and in turn cause the associated fan motors 250, 238 and 242 to stop operation. Where a screw compressor is employed, there are no cylinders to load in stepwise sequence. Then the fans will be turned on and off in response to positions of the unloading slide or to characteristics of the unloader controller so that the number of fans operating is directly or indirectly related to the fraction of the compressor capacity which is operational.

Having explained the use and workings of their invention, applicants now claim their invention as follows:

1. An improved refrigeration system comprising a compressor having an ON condition and an OFF condition; control means for establishing said ON and OFF conditions; at least one evaporator; a first fan positioned to move air over an evaporator, said fan having an ON condition; a second fan, positioned to move air over an evaporator, said second fan having an ON condition and an OFF condition; wherein the improvement comprises: means for achieving substantial correspondence between
    (a) compressor in the OFF condition and an evaporator fan in the OFF condition, and
    (b) compressor in the ON condition and said fan in the ON condition.

2. A method of achieving power economy in a refrigerating system, including a compressor having an ON and OFF condition, an evaporator, a first evaporator fan having an ON condition, a second evaporator fan having an ON and OFF condition, comprising the steps of
    (a) establishing the compressor in an ON condition and substantially cotemporaneously establishing a fan in its ON condition, and
    (b) establishing said compressor in an OFF condition and substantially cotemporaneously establishing an evaporator fan in its OFF condition.

* * * * *